May 8, 1951

C. A. LANG 2,552,191

AIR FILTER

Filed July 21, 1948

INVENTOR.
CHARLES A. LANG
BY Paul, Paul & Moore
ATTORNEYS

INVENTOR.
CHARLES A. LANG
BY Paul, Paul & Moore
ATTORNEYS

May 8, 1951  C. A. LANG  2,552,191
AIR FILTER

Filed July 21, 1948  5 Sheets-Sheet 5

INVENTOR.
CHARLES A. LANG
BY Paul, Paul & Moore
ATTORNEYS

Patented May 8, 1951

2,552,191

UNITED STATES PATENT OFFICE 2,552,191

AIR FILTER

Charles A. Lang, Minneapolis, Minn., assignor to Russell-Miller Milling Co., Minneapolis, Minn., a corporation of Delaware Application July 21, 1948, Serial No. 39,851

7 Claims. (Cl. 183—61)

The present invention relates to an air filter and more particularly to the stocking dust collector type in which the air is filtered through a stocking or bag. The invention is applicable to the separation of solid dust particles from almost any type of dust laden atmosphere, and is particularly adapted to the separation of dust from air streams in flour mills and similar establishments.

Dust collectors or air filters of the stocking type have been known. They have, however, been subject to various disadvantages. The present invention overcomes these disadvantages and includes novel features which will be apparent from the description given hereinafter.

It is, therefore, an object of the present invention to provide an air filter or stocking dust collector possessing novel features overcoming disadvantages of the prior art.

Other and further objects of the invention are those inherent in the apparatus herein illustrated, described and claimed.

In the drawings:

Figure 5 is a section taken on the line 5—5 of Figure 4;

Figure 6 is a section taken on the line 6—6 of Figure 4;

Figure 7 is a section taken along the lines 7—7 of Figure 4;

Figure 10 is an enlarged partial elevation of the chain drive and support mechanism for the dust removal device; and Figure 11 is a side elevation, partly in section, of the apparatus of Figure 10.

Throughout the drawings corresponding numerals refer to the same parts.

Figure 1:
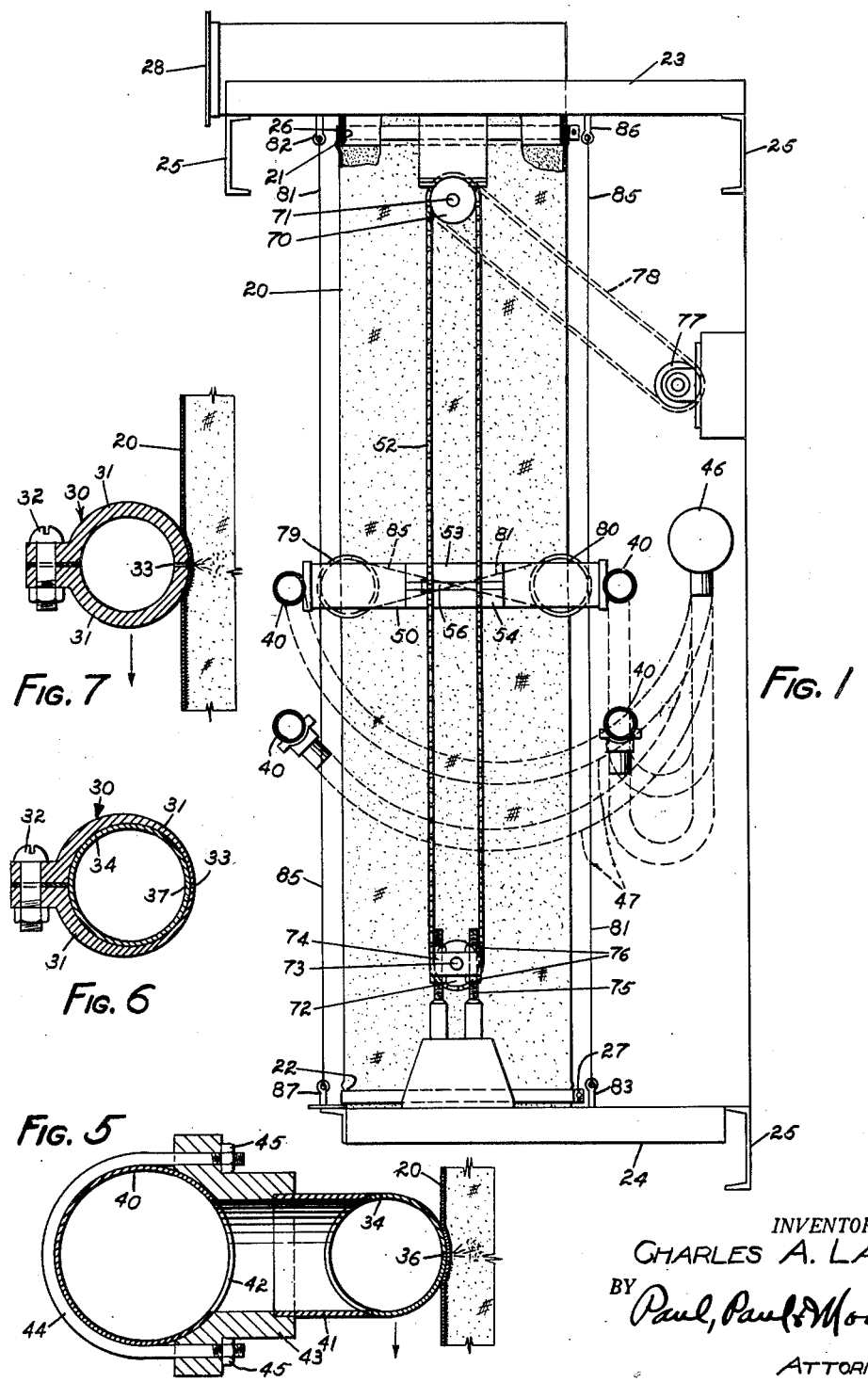
Figure 1 represents a side elevation partly in section showing the air filter of the present invention.
Figure 3:
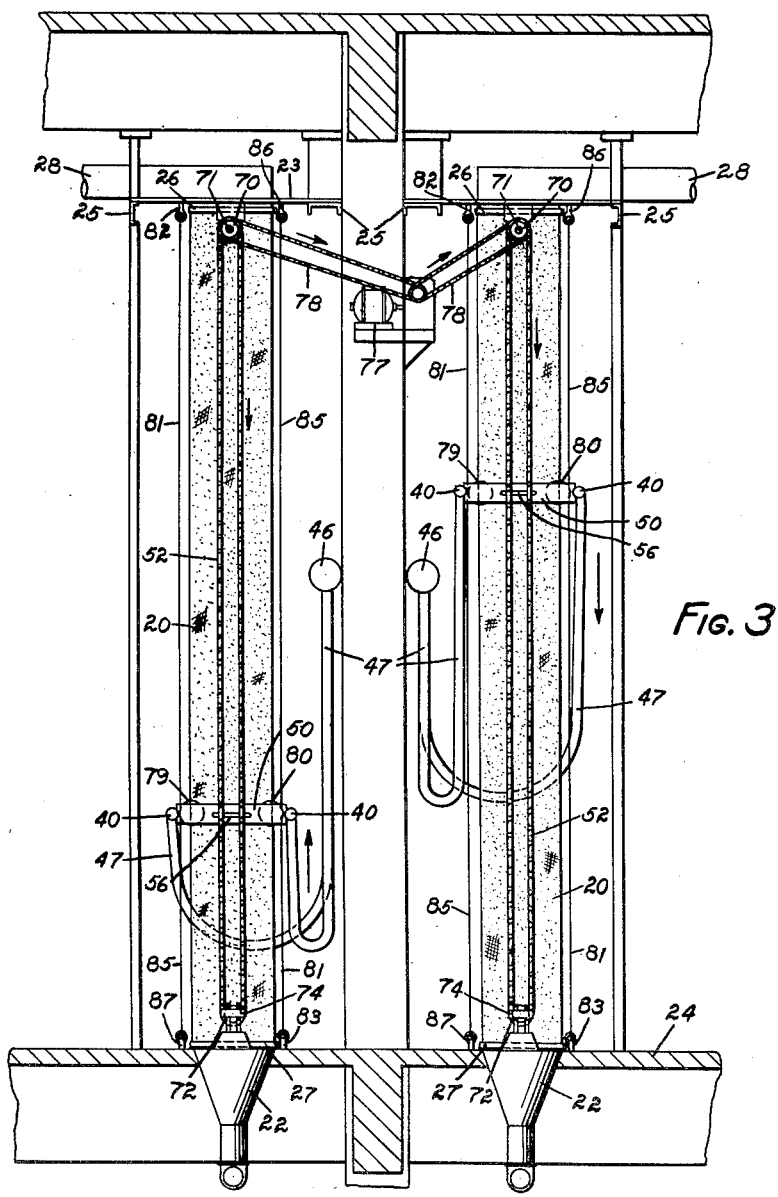
Figure 3 is a side elevation of the apparatus illustrating its installation in a building and showing how multiple units may be connected such that one unit counterbalances the other.
Figure 4:
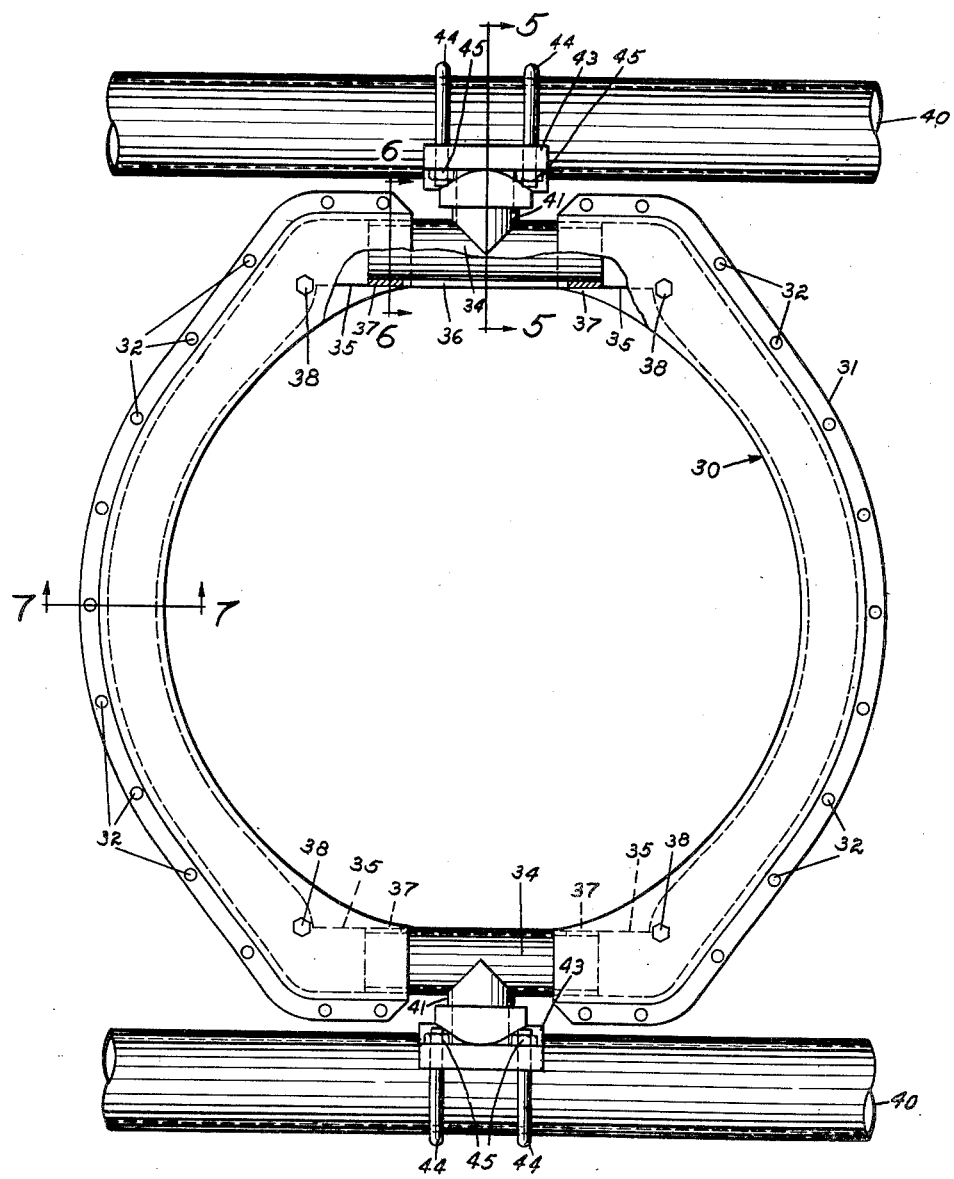
Figure 4 is a plan view, partly in section, of one of the dust removing units illustrated in Figure 2 showing some of the details of construction.
Figure 8:
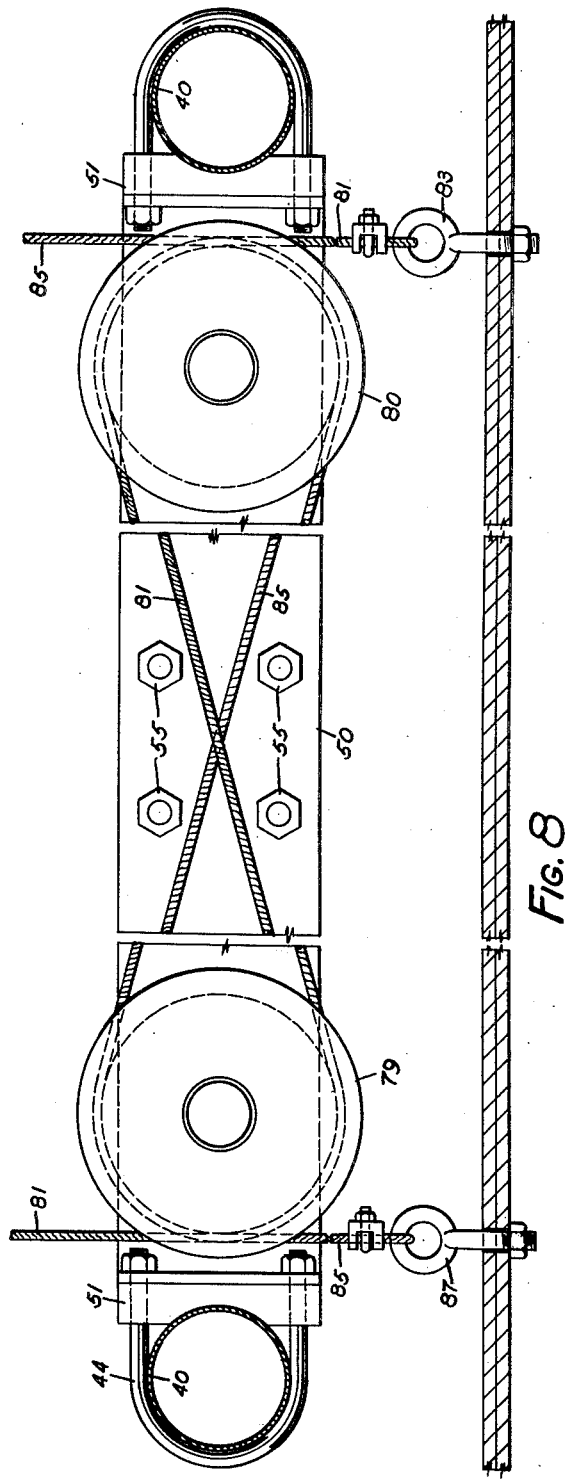
Figure 8 is a section taken along the line 8—8 of Figure 2 illustrating the mechanism for maintaining the dust removal apparatus level during movement.
Figure 9:
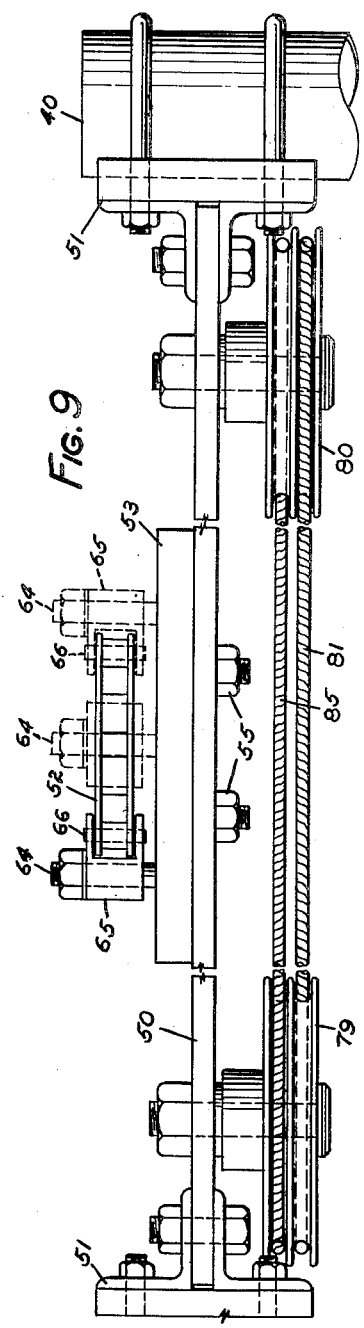
Figure 9 is a plan view of the apparatus of Figure 8.

With reference particularly to Figures 1 and 3 the apparatus is composed of one or several filter bags, each of which is supported between an upper inlet spout 21 and a lower discharge spout 22 which spouts are suitably supported by members 23 and 24, respectively. These members 23 and 24 may be suitably supported in the framework 25 which may form part of the support of the building as shown in Figure 3. The filter bag surrounds the spouts 21 and 22 and is secured thereto by means of rings 26 and 27. The inlet spout is connected to an inlet conduit 28 for incoming dust laden air or other gas which is to be filtered.

As will be seen from Figure 3, the discharge spout 22 converges to a restricted outlet which is closed by a pinch orifice screw or other device not illustrated for removing the said material filtered out. The air or gas within the bag 20 is thus forced to filter through the bag, depositing the dust on the inner surface of the bag. The air or gas being filtered is discharged into the room in which the apparatus is located and is withdrawn therefrom by any suitable stock or fan, not illustrated.

The present apparatus provides means for continuously removing the deposited dust from the inner surface of the bag. This apparatus is shown in detail in Figures 2, 4, 5, 6 and 7. This apparatus is composed of a ring 30 adapted to surround the filter bag. The inner circumference of the ring is slightly less than the circumference of the bag and as a result the bag is constricted by the ring which thus tends to flex the bag inwardly as is shown in Figures 5 and 7.

Each of the rings 30 is composed of two halves, each half of which is composed of upper and lower sections 31 suitably fastened together, as for example by means of bolts 32 around the outside periphery. A small slot 33 extends around the inner circumference of the pair of ring sections. The two halves of the ring are joined and supported in the device by means of T-shaped conduit sections 34, the ends of which slip into the annular portions 35 of the ring. The conduit 34 is slit along the inner edge 36 except at the points 37 where the halves of the rings overlap the ends of the conduit sections and are clamped thereon. The ring sections are clamped on these conduits by means of the bolts 32 adjacent the ends of the ring halves and also by means of bolts 38 which pass from one section of a ring half to the other, and by sliding either or both halves of the ring on members 34, the size and position of the bag orifice can be changed.

The bag blowing frame includes air conduits and frame members 40 extending laterally along the sides of the bag filters and a plurality of the rings 30. The air conduits 40 are connected to the T-conduit sections 34 by means of the lateral conduits 41 which are in turn connected to a side opening 42 in the air conduit and frame members 40. As shown in Figure 5 this connection is by means of a clamp composed of a casting 43 into which the lateral conduit 41 of the T is fastened. The clamp includes U-shaped tie bolts 44 which surround the air conduit and frame members and are fastened to the casting 43 by means of nuts 45. Air conduit and frame members 40 are connected to an air pressure supply pipe 46 by means of flexible connections such as rubber hoses 47.

Figure 2:
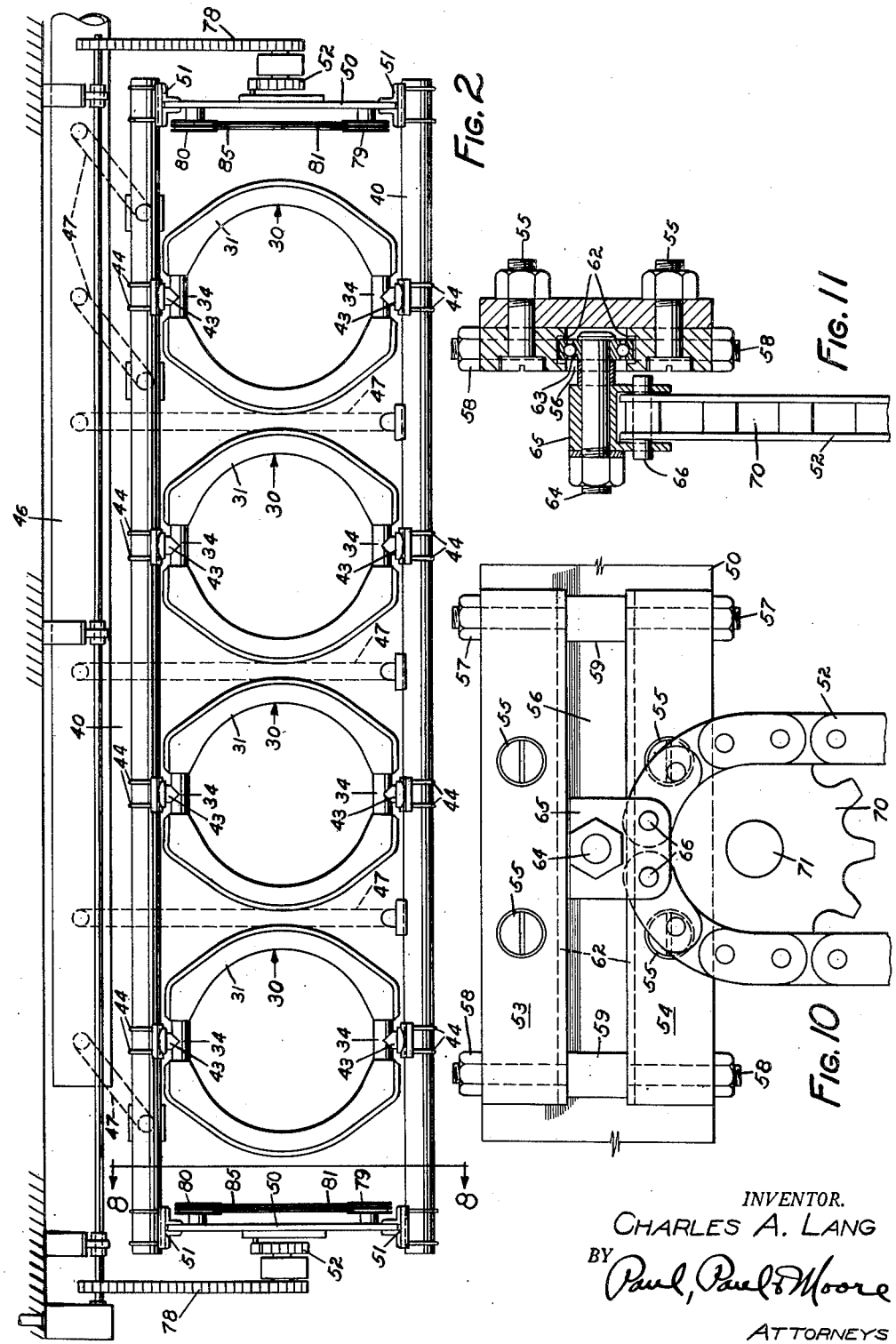
Figure 2 represents a plan view of the mechanism for cleaning and removing separated dust particles from the apparatus.

The bag blowing frame is assembled into a rigid structure by means of the plurality of rings 30 which extend across between the two air conduits 40, as will be seen in Figure 2 and by end cross members 50. The ends of the air conduits 40 are sealed off so that each is a manifold in which air under pressure may be maintained. A cross member 50 extends from one end of one of the air conduits 40 to the corresponding end of the other one and is suitably attached to each by means of brackets 51. This provides a rigid structure and enables all of the rings 30 to be maintained in the same plane without variation.

The entire bag blowing frame consisting of the series of rings 30, the air conduits 40 and the end members 50 is supported on moving drive chains 52 in the manner presently to be described with particular reference to Figures 10 and 11. A pair of bars 53 and 54 are attached to the cross member 50 by means of screws 55, as shown in Figure 10, to provide a slot 56 between the two bars 53 and 54. This slot is maintained fixed by means of bolts 57 and 58 which pass through the ends of the bars 53 and 54 and which, by means of sleeves 59, serve to space the two bars and provide the slot 56. As is shown in Figure 11 the bars 53 and 54 have channels 62 cut into the sides of the bars which face the slot 56. These grooves form a way for bearing 63. This bearing is supported on a bolt 64 which passes through the bearing and on which is supported a yoke 65. This yoke passes over chain 52 and is attached thereto by means of pins 66 which are longer than the ordinary pins of the chain 52. It is thus apparent that the entire framework of the dust removal apparatus is supported by the chain 52.

As shown in Figures 1 and 3, chain 52 is supported at its upper end of a sprocket 70 which is keyed to shaft 71 suitably suspended from the member 23. At its lower end chain 52 is supported on sprocket 72 which in turn is mounted on shaft 73 which is journaled in bearing 74 adjustably supported on screws 75 mounted on member 24. The bearing 74 may be secured in any desired position on the screws 75 by means of nuts 76. This adjustment permits the chain to be maintained in any desired tension. Shaft 71 is driven by motor 77 through chain 78.

In order to maintain the blower frame of the dust removal apparatus level at all times, I have provided the following mechanism:

A pair of double grooved pulleys 79 and 80 are rotatably mounted on each of the cross members 50. A cable 81 supported at its upper end in eyelet 82 passes around pulley 79 in the bottom side of one of the grooves therein. It then passes diagonally upwards around the pulley 80 on the upper side of one of the grooves therein and then downwardly to be attached to eyelet 83 supported in member 24. A second cable 85 attached at its upper end in eyelet 86 passes around the lower side of pulley 80 in the remaining groove therein and then upwardly around the upper side of the pulley 79 in the remaining groove therein and then downwardly to be attached to eyelet 87 supported on member 24. As the dust removal mechanism is raised and lowered, this double pulley arrangement and the cables operate to keep the framework level at all times. At the same time there is sufficient flexibility in the cables 81 and 85 to permit slight sideward movement of the entire framework of the dust removal apparatus to permit this apparatus to accommodate itself to slight misalignment or variations in dimension of the filter bag 20.

In operation the dust laden air is introduced into the apparatus, preferably by means of the upper conduit 28. From this conduit the air passes into the inside of the filter bag. The outlet from the lower end of the filter bag is restricted and this results in the maintenance of a slight positive pressure inside the bag as compared with the external pressure. As a result the air passes through the filter bag, depositing the dust on the inner surface of the bag. During the course of this deposition of the dust, the dust particles apparently agglomerate and fall downwardly along the inner wall of the bag and out through the discharge opening in the box.

The blower frame and blower rings of the dust removal apparatus serves the purpose of dislodging dust particles from the bag wall. This is accomplished by supplying air at relatively high pressure to the air header 46 through hoses 47 and into the air conduits 40 which form a part of the blower frame. From these conduits it passes through the lateral conduits 41 into conduit 34, thence through slot 36 in the T-shaped conduits 34 and thus the slots 33 in the ring (Figures 5 and 7). The bag is flexed by the ring and this tends to dislodge some of the caked dust and at the same time the high pressure air impinges upon the external wall of the inwardly flexed section of the bag and serves to further dislodge particles therefrom. The inward flexing of the bag wall serves to open the dense structure of the inside of the bag to permit the dust to be easily flushed off. The particles of dust thus removed are considerably larger than the dust particles in the incoming dust laden air and as a result they settle inside the bag and are discharged from the bottom thereof. In this manner the filter can be operated continuously with continuous removal of deposited dust.

The entire blower frame assembly of the dust removal apparatus is moved continuously upwardly and downwardly by means of the chain 52 to which bolt 64 is attached. As the blower frame assembly reaches the topmost point of ascent, the bolt 64 moves laterally along slot 62 from one end thereof to the other, and the entire assembly then begins a descent. At the bottom of the descent the bolt 64 and roller 63 moves from the end of the slot back to the end in which it was during ascent and the process is repeated. The rate of ascent and descent of this dust removal assembly can be relatively slow and for this purpose it is usually desirable to reduce the speed of the motor 77, either by gear reduction or by the use of a pulley combination. During this ascent and descent the cables 81 and 85 passing around the double grooved pulleys 79 and 80 serve to maintain the assembly level throughout.

In Figure 3 there is illustrated a multiple unit set-up in which two units are operated in a manner that the weight of the blower frame in one unit is counterbalanced against the other. In this figure each of the units is a complete duplication of the unit shown in Figure 1, but the drives are interconnected through a common gear-motor drive 77. In this manner the weight of the descending blower frame is balanced against that of the ascending frame and this assists the motor 77 in raising the ascending blower frame. The direction of the drives is indicated by arrows. It will be apparent that the weight of the descending blower frame at the right-hand side of Figure 3 is of assistance in raising the ascending blower frame in the left-hand side of Figure 3.

A further important feature of the invention is the adjustability of the rings 30. The halves of the ring are adjustable along the length of the T-conduit sections 34 in order to be adapted to variations in size of the filter bag. For this purpose it is merely necessary to loosen the bolts 32 and bolts 38, adjacent the ends of the halves of the ring and slide the assembly along the conduit section 34 to any desired position. This adjustment work can be done without any effect whatsoever on the frame of the dust removal apparatus itself. The adjustment does not affect the length or any other dimension of this framework.

It is apparent from the foregoing that the present apparatus makes possible simple and efficient structure for the removal of dust from dust-laden air. It permits the continuous operation of the filter while the deposited dust is simultaneously being discharged. It provides a simple means for maintaining the dust removal assembly horizontal without the necessity of complicated guide structure. At the same time this assembly is free for limited lateral movement to adjust itself to the filter bags. Moreover, the apparatus provides a novel chain and cam action drive for raising and lowering the dust removal assembly and for changing its direction. The apparatus likewise provides a system of counterbalancing units to economize on power required for operation. Furthermore, the apparatus provides an adjustable structure for the individual dust removal units which is without effect upon the blower frame assembly of the dust removal unit.

While various modifications of the invention have been described, it is to be understood that the invention is not limited thereto and that other modifications of the invention may be made without departing from the spirit thereof.

What I claim is:

1. A dust removal device for a cylindrical air filter comprising a pair of air conduits in spaced relation alongside each other, relatively short conduit members extending alongside each of said air conduits and substantially parallel thereto and in communication therewith, said relatively short conduits being disposed between the air conduits, a pair of ring halves supported by the ends of said short conduit members, each of said ring halves being supported at one end on one of said conduit members and at the other end on the other of said conduit members and being slidably adjustable longitudinally of the conduit members to vary the distance between the ring halves.

2. Apparatus according to claim 1 in which the ring halves are each composed of a pair of superimposed members fastened together along the outside and having a continuous air discharge slot along the inside edge.

3. An air filter comprising a cylindrical filter bag, inlet means for dust-laden air at the top of said bag and outlet means for separated dust at the bottom of the bag, dust removal apparatus surrounding said bag and including a generally rectangular framework having air conduits along the sides and frame members across the ends, a pair of double grooved pulleys on said cross members and cable means passing over said pulleys for maintaining said rectangular framework at right angles to the axis of the filter bag.

4. An air filter comprising a cylindrical filter bag, inlet means for dust-laden air at the top of the bag, outlet means for separated dust at the bottom of the bag, dust removal means, said dust removal means including a ring circumscribing the bag and supported between a pair of air conduits, said air conduits being interconnected at their ends by frame members, said frame members being provided with a device having a horizontal slot across said frame member, a bearing movable in said slot, said bearing being attached to an endless chain supported substantially parallel to the bag and in a plane substantially parallel to the slot, whereby said dust removal device is supported and moved longitudinally of said bag in both directions by said chain.

5. A dust separator comprising a plurality of tubular fabric filter bags positioned substantially vertically and spaced from each other in a line, each being connected at its upper end to a supply line carrying the dust laden gas under slight pressure and connected at its lower end to a restricted orifice from which the dust which is filtered out can be withdrawn, a blower frame assembly for removing the dust collected on the inside of the filter bags including substantially straight and horizontal conduit frame-members along each side of the line of bags, said conduit-frame members being interconnected at their ends so as to form a substantially rectangular frame enclosing a plurality of the filter bags, a ring conduit encircling each bag and shaped so as slightly to constrict the bag, each such ring conduit being connected to each horizontal conduit-frame member and each ring being composed of halves separated by a vertical plane of division and adjustable connections between said halves for varying their relative positions, each half and said connections being provided with an air discharge slot throughout substantially its entire inner periphery of the ring where in contact with the bag, means for holding the blower frame assembly substantially horizontal and for simultaneously moving it up and down around the filter bags and an air pressure supply pipe connected to said conduit frame members.

6. An apparatus of the character set forth in claim 5 further characterized in that said means for holding said blower frame substantially horizontal includes a pair of double grooved pulleys mounted in horizontally spaced relation at each end of said blower frame and a pair of cables at each end of said frame, each pair af cables at each end being anchored at a vertical position and at a horizontal position and each pair extending from its upper anchored position, thence down one cable under one pulley and the other under the other pulley of the pair, each cable being then run over the other pulley of the pair at the same end and thence to its lower anchor.

7. The apparatus of the character set forth in claim 5 further characterized in that each ring conduit encircling said filter bags is composed of two halves separated along a plane through the axis of the ring, each half being composed of an upper and lower matching portion separated along the median plane of the ring perpendicular to its axis, said halves being joined by nipples slip-fitted into each half.

CHARLES A. LANG.

REFERENCES CITED

The following references are of record in the file of this patent:

UNITED STATES PATENTS

| Number | Name | Date |
|---|---|---|
| 1,321,490 | Sweetland | Nov. 11, 1919 |
| 1,944,267 | Rathbun | Jan. 23, 1934 |
| 1,944,268 | Rathbun | Jan. 23, 1934 |
| 2,495,635 | Hersey | Jan. 24, 1950 |

FOREIGN PATENTS

| Number | Country | Date |
|---|---|---|
| 255,876 | Germany | Jan. 23, 1913 |
| 709,109 | Germany | July 3, 1941 |
| 737,109 | Germany | July 7, 1943 |